(12) United States Patent
Noguchi et al.

(10) Patent No.: US 7,034,326 B2
(45) Date of Patent: Apr. 25, 2006

(54) LAMINATED HEAT-REFLECTING WINDSHIELD WITH DETECTING DEVICE

(75) Inventors: Tatsuya Noguchi, Osaka (JP); Hideki Imanishi, Osaka (JP); Seiichiro Honjo, Osaka (JP)

(73) Assignee: Niles Co., Ltd., Tokyo (JP)

( * ) Notice: Subject to any disclaimer, the term of this patent is extended or adjusted under 35 U.S.C. 154(b) by 151 days.

(21) Appl. No.: 10/276,490

(22) PCT Filed: May 23, 2002

(86) PCT No.: PCT/JP02/04982

§ 371 (c)(1),
(2), (4) Date: Apr. 14, 2003

(87) PCT Pub. No.: WO02/096639

PCT Pub. Date: Dec. 5, 2002

(65) Prior Publication Data

US 2003/0155790 A1    Aug. 21, 2003

(30) Foreign Application Priority Data

May 25, 2001  (JP) .............................. 2001-157521

(51) Int. Cl.
  *H05B 3/84*  (2006.01)
(52) U.S. Cl. .................. 250/573; 219/203; 250/227.25
(58) Field of Classification Search ................ 219/203; 250/573–576, 227.25; 428/627; 318/483
  See application file for complete search history.

(56) References Cited

U.S. PATENT DOCUMENTS

| 5,620,799 A |   | 4/1997  | Sauer |
| 5,703,568 A | * | 12/1997 | Hegyi ........................ 340/602 |
| 5,747,170 A |   | 5/1998  | Von Alpen et al. |
| 6,052,196 A |   | 4/2000  | Pientka et al. |
| 6,153,995 A | * | 11/2000 | Tanaka ....................... 318/483 |
| 6,492,619 B1| * | 12/2002 | Sol ............................. 219/203 |

FOREIGN PATENT DOCUMENTS

JP      8-210042    8/1996

* cited by examiner

*Primary Examiner*—ThanhX Luu
*Assistant Examiner*—Tony Ko
(74) *Attorney, Agent, or Firm*—Hamre, Schumann, Mueller & Larson, P.C.

(57) ABSTRACT

The present invention provides a heat-reflecting windshield that includes a laminated glass sheet and a detecting device for optically detecting a target object such as water droplets. The laminated glass sheet includes a first glass sheet, a heat-reflecting film formed on the first glass sheet, an intermediate film and a second glass sheet. The detecting device is disposed on a main surface of the laminated glass such that a light-emitting element and a light-receiving element in the device are arranged in a predetermined region of the main surface, and the predetermined region is rubbed by a windshield wiper. The heat-reflecting film includes at least three dielectric layers and at least two metal layers, and the heat-reflecting film is not formed in said predetermined region.

8 Claims, 4 Drawing Sheets

LAMINATED HEAT-REFLECTING WINDSHIELD WITH DETECTING DEVICE

FIELD OF THE INVENTION

The present invention relates to a heat-reflecting windshield. In particular, the present invention relates to a windshield for automobiles that has at least 70% transmittance of visible light and is provided with a device for optically detecting adhering moisture.

BACKGROUND OF THE INVENTION

In order to reduce a cooling load and to enhance comfort, a heat-reflecting glass sheet is known that reflects infrared rays (i.e., heat-ray) in sunlight. A conventional heat-reflecting glass includes a metal film, a transparent conductive film, or a nitride film. As a film capable of enhancing reflection of infrared rays while keeping a high transmittance of visible light, a heat-reflecting film is known that includes a multi-layered structure of metal oxide/metal/metal oxide.

When an optical device is used in a vehicle provided with a glass sheet that has a heat-reflecting film including a metal film, light from the device is attenuated while passing through the heat-reflecting film. The optical device for a vehicle is, for example, a rain sensor that can optically detect adhering water droplets on the outer surface of a windshield. In the rain sensor, a light-emitting element provided on the inner surface of the windshield emits light, and light reflected from the outer surface of the windshield is received by a light-receiving element provided on the inner surface, whereby the presence/absence of droplets of water on the outer surface is detected based on the intensity of reflected light. In this case, light for detection passes through the heat-reflecting film at least twice. Thus, the sensitivity of detecting water droplets adhering to the surface of the windshield is degraded.

JP 8(1996)-210042 A discloses a window used with a transmitter and/or a receiver that function particularly in an infrared range, wherein an infrared-rays reflecting and/or absorbing layer is disposed on the entire surface of the window excluding a surface region for transmission of the infrared light for the transmitter and/or the receiver. However, JP 8(1996)-210042 A discloses a window used with a communication tool rather than a detecting device.

DISCLOSURE OF THE INVENTION

The present invention provides a heat-reflecting windshield including a laminated glass sheet and a detecting device for optically detecting a target object such as water droplets that has a light-emitting portion and a light-receiving portion. The laminated glass sheet includes a first glass sheet, a heat-reflecting film formed on the first glass sheet, an intermediate film and a second glass sheet. The detecting device is disposed on a main surface of the laminated glass sheet such that the light-emitting element and the light-receiving element are arranged in a predetermined region of the main surface, and the predetermined region is rubbed by a windshield wiper. The heat-reflecting film includes a first dielectric layer, a first metal layer, a second dielectric layer, a second metal layer and a third dielectric layer, and the heat-reflecting film is not formed in the predetermined region.

The present invention also provides a heat-reflecting laminated glass sheet including a first glass sheet, a heat-reflecting film formed on the first glass sheet, an intermediate film and a second glass sheet. A main surface of the laminated glass includes a predetermined region where a detecting device optically detects a target object. The heat-reflecting film includes a first dielectric layer, a first metal layer, a second dielectric layer, a second metal layer and a third dielectric layer, and the heat-reflecting film is not formed in the predetermined region.

DETAILED DESCRIPTION OF THE INVENTION

The laminated glass sheet of the present invention includes a first glass sheet, a heat-reflecting film formed on the first glass sheet, an intermediate film and a second glass sheet, and the heat-reflecting film includes a first dielectric layer, a first metal layer, a second dielectric layer, a second metal layer and a third dielectric layer. At least one layer selected from the first dielectric layer, the second dielectric layer and the third dielectric layer preferably includes a metal oxide that includes at least one element selected from Al, In, Sn and Zn. The metal oxide may include ITO (Indium Tin Oxide), $SnO_2$, and ZnO At least one selected from the first metal layer and the second metal layer preferably includes Ag.

The laminated glass sheet preferably has a region outside the above-mentioned region where a visible light transmittance is 70% or more. In this second region, a solar transmittance is preferably 40% or less. This region should be a transparent region where the heat-reflecting film is formed. It is preferable that a ceramic mask (ceramic print) is preferably provided on a periphery of the region. The ceramic mask may be provided on the periphery of the windshield to form an opaque framework.

The detecting device may be a rain sensor, a fogging sensor or a rain/fogging sensor in which these two sensors are integrated.

The device may be directly attached to a windshield. The device should be arranged in a region where the device does not obstruct the driver's view.

When a shade band for decreasing a transmittance of light is formed with the ceramic mask, the appearance of a vehicle is improved.

An embodiment of the process for manufacturing the windshield of the present invention is described below.

(1) Glass Cutting

First, a glass sheet is cut into a predetermined shape.

(2) Printing

Figure 3:
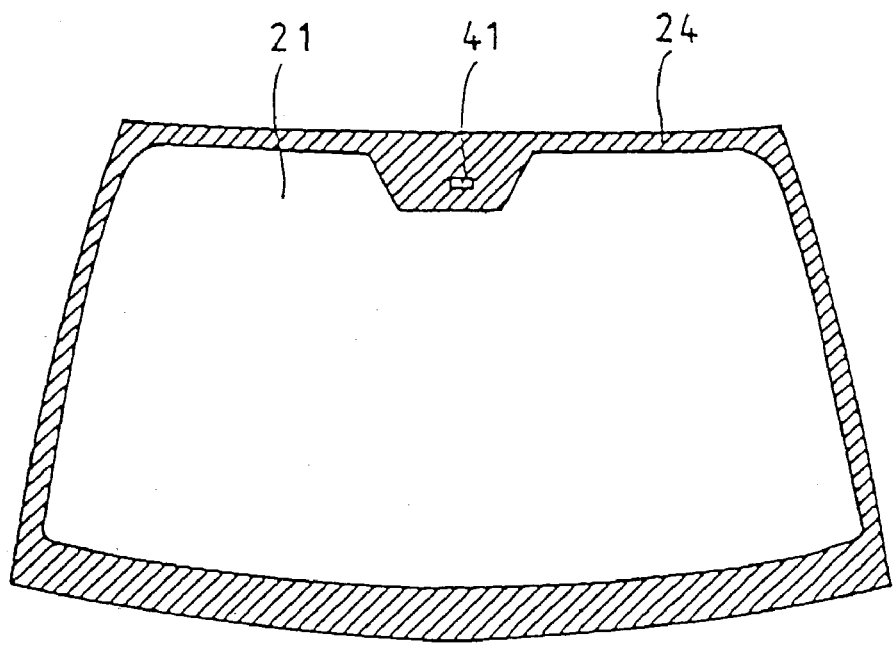
FIG. 3 shows a plan view of a heat-reflecting windshield of the present invention.

As shown in FIG. 3, a ceramic mask 24 is formed on the periphery of the glass sheet 21 to surround a water-detecting region 41. The ceramic mask may be formed by conventional methods. For example, this opaque black layer can be formed by screen-printing a ceramic paste onto the glass sheet, followed by sintering.

(3) Bending

Successively, the glass sheet having a framework of the ceramic mask (a first glass sheet) and a second glass sheet that is cut into the same shape as that of the first glass sheet are bent into a predetermined windshield shape by sag bending.

(4) Forming a Heat-Reflecting Film

Figure 2:
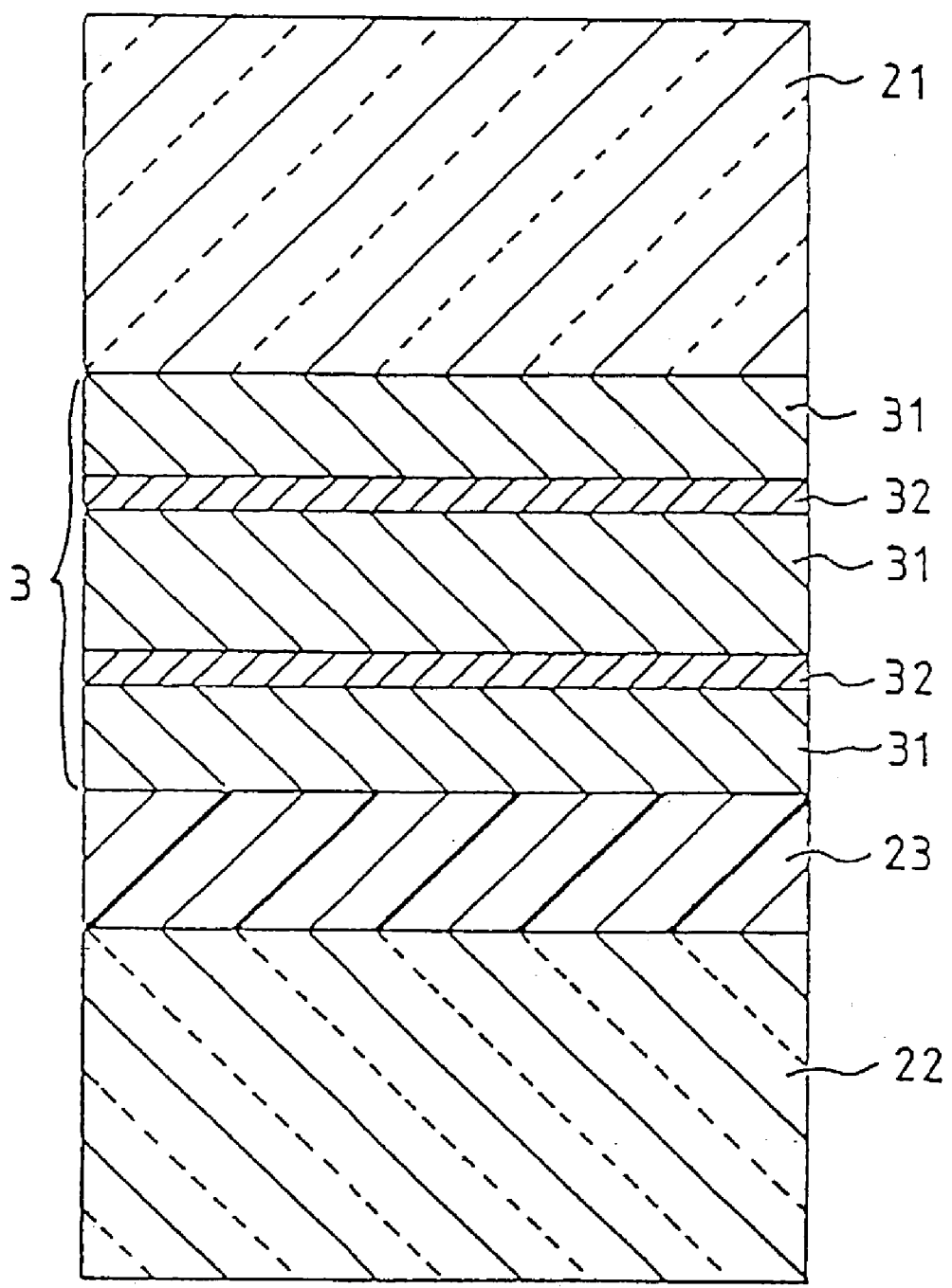
FIG. 2 shows a cross-sectional view of a heat-reflecting film used in the present invention.

The surface of the bent glass sheet to be disposed outside a vehicle (for example, the first glass sheet) is washed, and the layers for a heat reflecting film are formed successively on the surface. The heat-reflecting film 3 has a five-layered structure in which at least three metal oxide films 31 and at least two metal (Ag) films 32 are stacked alternately as shown in FIG. 2, although the heat-reflecting film further may include other films such as a protective layer.

For example, the first metal oxide layer, a first silver layer, a second metal oxide layer, a second silver layer and a third metal oxide layer are formed in this order on the first glass sheet 21 by an in-line type d.c. sputtering.

Figure 4:
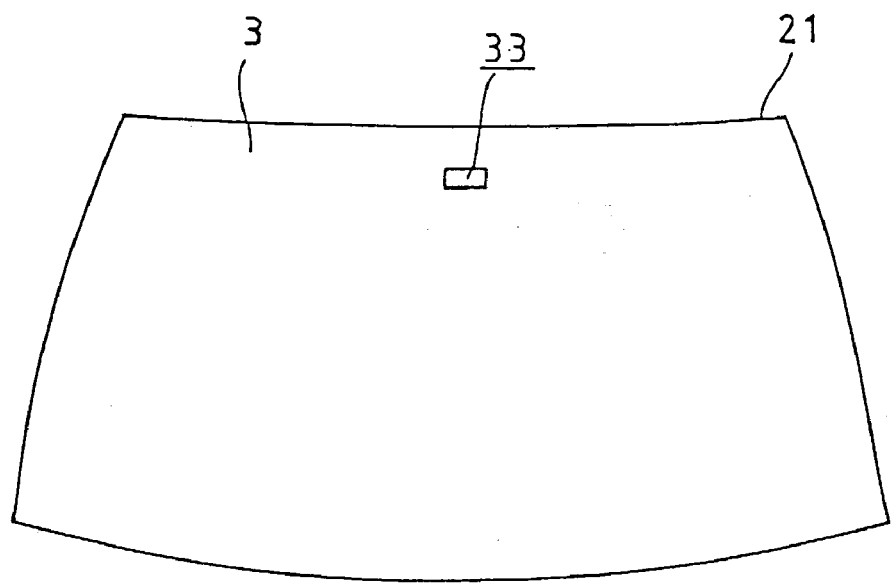
FIG. 4 illustrates a position of a region where a heat-reflecting film is not formed.

To prevent the heat-reflecting film 3 from being formed in a region 33 where a detecting device is attached as shown in FIG. 4, a shielding plate may be disposed on the region during the film formation process, or the region may be masked with an adhesive tape.

(5) Lamination

Lastly, the glass sheet with a heat-reflecting film thus obtained is attached to the other glass sheet via a PVB film as an intermediate thermoplastic layer to obtain a laminated glass sheet.

Figure 1:
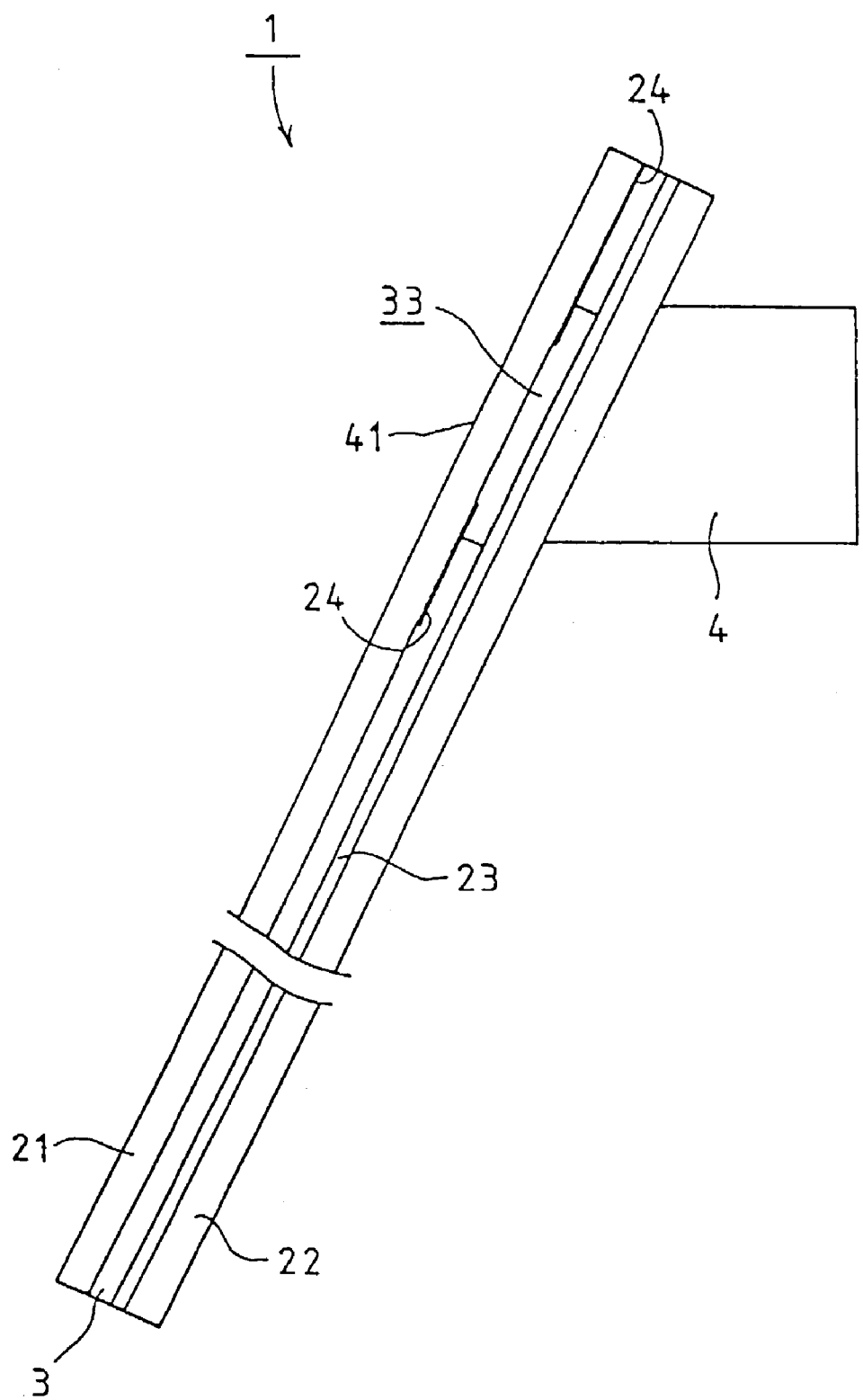
FIG. 1 shows a cross-sectional view of a heat-reflecting windshield of the present invention.

FIG. 1 shows a heat-reflecting laminated windshield. The heat-reflecting laminated windshield 1 includes the first glass sheet 21 positioned outside a vehicle, the second glass sheet 22 positioned inside the vehicle, and the intermediate film (PVB) 23. The heat-reflecting film 3 is formed on the inner surface of the first glass sheet 21 and in contact with the intermediate film 23. The region 33 where the heat-reflecting film 3 is not formed includes the water-detecting region 41 that is surrounded by the ceramic mask 24. The ceramic mask 24 covers the edge of the heat-reflecting film 3.

A detecting device 4 is attached to the inner surface of the windshield 1 such that a light emitting/receiving portion in the detecting device 4 is positioned in the region 33 where the heat-reflecting film 3 is not formed, more specifically, such that a light-emitting element and a light-receiving element are arranged in the region 33. These elements in the device 4 (not shown in FIG. 1) detect raindrops or the like in the region 41 of the outer main surface of the windshield 1.

EXAMPLES

A laminated glass sheet with a heat-reflecting film was obtained by the above-described method, and a rain sensor was attached to a region where the heat-reflecting film was not formed.

Table 1 shows a film composition of the heat-reflecting film in each example, and Table 2 shows optical characteristics of the laminated glass sheet in each example.

TABLE 1

| | | 1st layer | | 2nd layer | 3rd layer | | | 4th layer | 5th layer | (nm) |
|---|---|---|---|---|---|---|---|---|---|---|
| Ex. 1 | Material | ITO | | Ag | ITO | | | Ag | ITO | |
| | Thickness | 28 | | 8 | 70 | | | 10 | 28 | |
| Ex. 2 | Material | ZnO | | Ag | ZnO | | | Ag | ZnO | |
| | Thickness | 35 | | 8 | 76 | | | 12 | 25 | |
| Ex. 3 | Material | AZO | | Ag | AZO | | | Ag | AZO | |
| | Thickness | 36 | | 8 | 81 | | | 12 | 26 | |
| Ex. 4 | Material | SnO$_2$ + AZO | | Ag | AZO + SnO$_2$ + AZO | | | Ag | AZO + SnO$_2$ | |
| | Thickness | 14 | 25 | 8 | 24 | 38 | 19 | 11 | 19 | 12 |

AZO: a ZnO film doped with 2% by mass of Al$_2$O$_3$.

TABLE 2

| | Transmission | | | | Reflection | | |
|---|---|---|---|---|---|---|---|
| | Visible Light Transmittance | Solar Transmittance | Color | | Visible Light Reflectance | Color | |
| | (%) | (%) | a | b | (%) | a | b |
| Ex. 1 | 77.1 | 39.7 | −4.3 | 1.0 | 8.3 | 1.1 | −1.6 |
| Ex. 2 | 73.8 | 39.3 | −3.0 | −1.8 | 9.8 | −0.1 | −1.0 |
| Ex. 3 | 73.7 | 39.2 | −3.6 | 0.2 | 10.3 | 0.0 | −0.7 |
| Ex. 4 | 71.2 | 38.7 | −2.9 | 0.0 | 8.0 | −0.6 | −1.6 |
| Clear glass (2 mm) | 90.6 | — | −0.6 | 0.1 | | | |
| Clear + PVB + Clear | 88.8 | 76.7 | −1.3 | 0.3 | | | |

In Example 4, a first metal oxide film in the heat-reflecting film is formed of two layers ($SnO_2$+AZO), a second metal oxide film is formed of three layers (AZO+$SnO_2$+AZO), and a third metal oxide film is formed of two layers (AZO+$SnO_2$). The glass sheet used as a substrate is a clear glass sheet having transmission characteristics as shown in Table 2.

As is understood from Table 2, the laminated glass sheet thus obtained had an excellent sunlight shielding property (i.e., 40% or less of solar transmittance) while having 70% or more of transmittance of visible light. The color of each example was neutral.

The region where the heat-reflecting film is not formed has a different color from that of the other region where the heat-reflecting film is provided, which could be recognized visually. However, the detecting device is attached to an inside of the windshield so that the region is not recognized by sight.

In the region where the heat-reflecting film is not formed, the detecting device is attached directly. Therefore, infrared rays are prevented from being directly incident upon a vehicle from that region.

Figure 5:
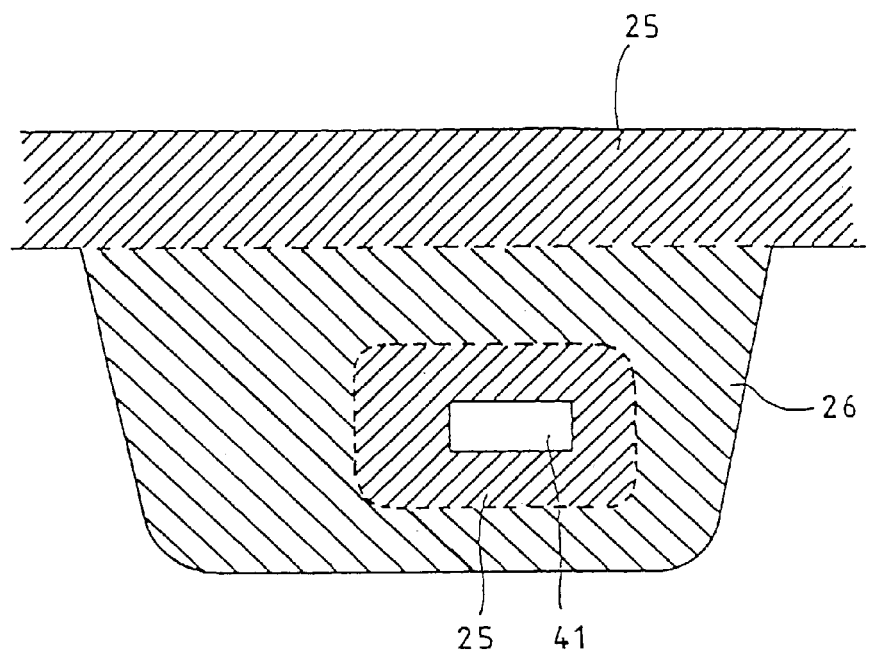
FIG. 5 shows a water-detecting region surrounded by a ceramic mask.

FIG. 5 shows an enlarged view of the water-detecting region 41 in a preferred embodiment of the present invention. A solid ceramic print 25 is formed around the region 41 as well as the periphery of the windshield. A ceramic mask 26 with a dot pattern also is formed around the region 41 and between the ceramic masks 25, 25.

A gradation with a dot pattern may be provided in a border portion between the ceramic mask on the periphery of the windshield and the transparent region of the windshield. A gradation with a dot pattern may be provided in a border portion between the ceramic mask on the periphery of the region and the transparent region of the windshield.

Figure 6:
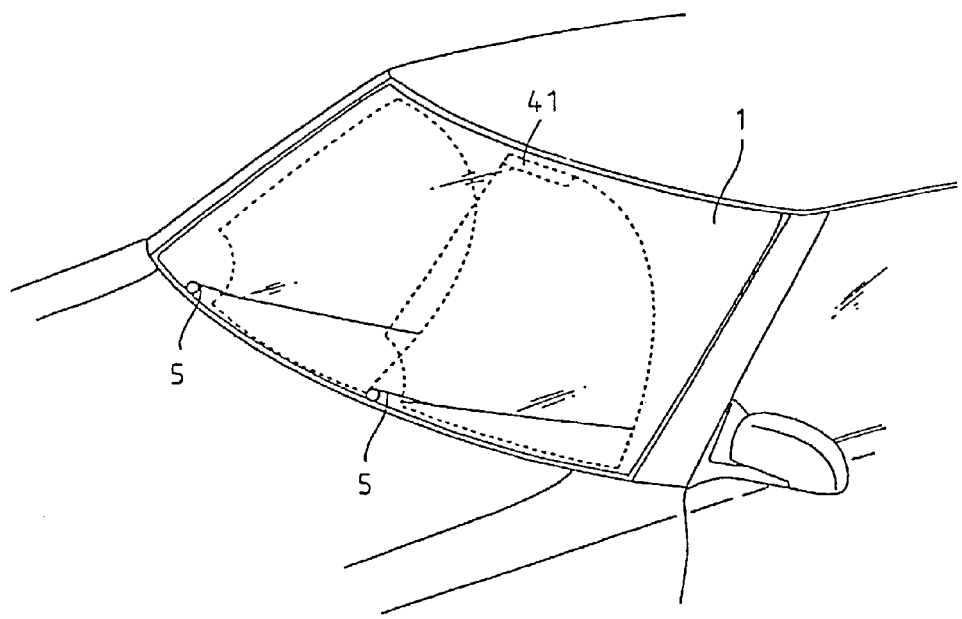
FIG. 6 shows a wiper-wiping region on a heat-reflecting windshield of the present invention.

In the region 41 for the detection by the detecting device 4, a ceramic mask should not be formed. The ceramic mask should provide a transparent region where the light emitted from a detecting device and enters the device detects a target object on the outer surface of the windshield. As shown in FIG. 6, the region 41 is disposed in a wiper-wiping area in a main surface of the windshield 1 where windshield wipers 5 rub.

A shade band with a low transmittance of visible light may be provided in an upper portion of the windshield. The shade band may be formed by dying PVB. The shade band should not cover the water-detecting region.

As the detecting device, a rain sensor and a fogging sensor are preferably used. It is efficient to integrate them with each other.

As described above, in the heat-reflecting windshield of the present invention, the heat-reflecting film is not provided in a region where a light-emitting element and a light-receiving element are provided. Therefore, light for the detection does not pass through the heat-reflecting film, which enables detection with good sensitivity to be conducted.

The invention claim is:

1. A heat-reflecting windshield comprising a laminated glass sheet, a detecting device for optically detecting a target object, and a ceramic mask that is provided on a periphezy of the windshield,
   the detecting device having a light-emitting element and a light-receiving element,
   the laminated glass sheet comprising a first glass sheet, a heat-reflecting film formed on the first glass sheet, an intermediate film and a second glass sheet,
   wherein the detecting device is disposed on a main surihee of the laminated glass sheet such that the light-emitting element and the light-receiving element are arranged in a predetermined region of the main surface, and said predetermined region is rubbed by a windshield wiper,
   wherein the heat-reflecting film comprises a first dielectric layer, a first metal layer, a second dielectric layer, a second metal layer and a third dielectric layer, and the heat-reflecting film is not formed in said predetermined region,
   wherein said predetermined region comprises an opening in the heat-reflecting film, is surrounded by the heat reflecting film, and includes a detecting region that is surrounded by the ceramic mask,
   wherein the ceramic mask covers the edge of the heat-reflecting film around the detecting region, and
   wherein the detecting device detects the target object in the detecting region.

2. The heat-reflecting windshield according to claim 1, wherein at least one selected from the first dielectric layer, the second dielectric layer and the third dielectric layer comprises a metal oxide that includes at least one element selected from Al, In, Sn and Zn.

3. The heat-reflecting windshield according to claim 1, wherein at least one selected from the first metal layer and the second metal layer comprises Ag.

4. The heat-reflecting windshield according to claim 1, wherein the laminated glass sheet has a second region outside said predetermined region, and the heat-reflecting film is formed in the second region, and
   wherein a visible light transmittance is 70% or more in the second region.

5. A heat-reflecting laminated glass sheet comprising a first glass sheet, a heat-reflecting film formed on the first glass sheet, an intermediate film, a second glass sheet, and a ceramic mask that is provided on a periphezy of the laminated glass sheet,
   wherein a main surface of the laminated glass comprises a predetermined region where a detecting device optically detects a target object, and
   wherein the heat-reflecting film comprises a first dielectric layer, a first metal layer, a second dielectric layer, a second metal layer and a third dielectric layer, and the heat-reflecting film is not formed in said predetermined region,
   wherein said predetermined region comprises an opening in the heat-reflecting film, is surrounded by the heat-reflecting film, and includes a detecting region that is surrounded by the ceramic mask,
   wherein the ceramic mask covers the edge of the heat-reflecting film around the detecting region, and
   wherein the detecting device detects the target object in the detecting region.

6. The heat-reflecting laminated glass sheet according to claim 5, wherein at least one selected from the first dielectric layer, the second dielectric layer and the third dielectric layer comprises a metal oxide that includes at least one element selected from Al, In, Sn and Zn, and at least one selected from the first metal layer and the second metal layer comprises Ag.

7. The heat-reflecting laminated glass sheet according to claim 5, wherein the laminated glass sheet has a second region outside said predetermined region, and the heat-reflecting film is formed in the second region, and
   wherein a visible light transmittance is 70% or more in the second region.

8. The heat-reflecting laminated glass sheet according to claim 7, wherein a solar transmittance is 40% or less in the second region.

* * * * *